United States Patent [19]
Siegel

[11] Patent Number: 5,679,074
[45] Date of Patent: Oct. 21, 1997

[54] AIR INLET INSTALLATION FOR AN AUTOMOBILE

[75] Inventor: Gunter Siegel, Horb, Germany

[73] Assignee: Mercedes-Benz AG, Stuttgart, Germany

[21] Appl. No.: 602,917

[22] Filed: Feb. 16, 1996

[30] Foreign Application Priority Data

Feb. 16, 1995 [DE] Germany ............... 195 05 213.7

[51] Int. Cl.$^6$ ................................................ B60H 3/06
[52] U.S. Cl. ........................... 454/147; 55/321; 454/158
[58] Field of Search ................................ 454/147, 158; 55/321, 385.3, 464

[56] References Cited

U.S. PATENT DOCUMENTS

| | | |
|---|---|---|
| 2,213,017 | 8/1940 | Perkins ............................. 454/147 |
| 3,738,621 | 6/1973 | Anderson ....................... 454/158 X |
| 4,354,863 | 10/1982 | Oleszak ........................... 55/464 X |
| 4,434,564 | 3/1984 | Braggins, Jr. ................... 55/321 X |
| 4,702,149 | 10/1987 | Speer . | |
| 4,894,073 | 1/1990 | Andreae . | |

FOREIGN PATENT DOCUMENTS

| | | |
|---|---|---|
| 25 49 663 | 5/1977 | Germany . |
| 4109745 | 10/1992 | Germany . |
| 42 34 045 | 10/1993 | Germany . |
| 4322951 | 8/1994 | Germany . |

Primary Examiner—Harold Joyce
Attorney, Agent, or Firm—Evenson McKeown Edwards & Lenahan, PLLC

[57] ABSTRACT

An air supply installation for a motor vehicle with an airflow passage connecting the air inlet with an air outlet, in which, viewed in the direction of flow, a water separator and an air filter are disposed behind each other. To obtain good separation of the water along with little noise generation, the water separator is embodied as an essentially vertically extending perforated wall, whose perforation holes respectively penetrate the wall with hole axes which are essentially parallel with each other, into which tubes have been inserted which preferably project from both sides of the wall. The air filter is disposed at only a short distance from the water separator and parallel therewith or inclined under an acute angle.

20 Claims, 2 Drawing Sheets

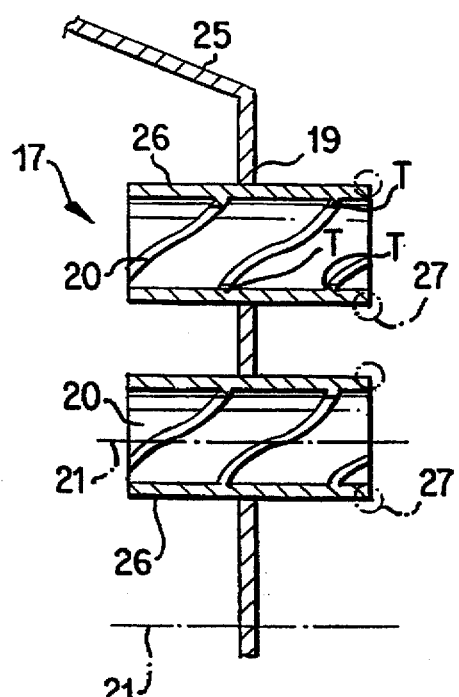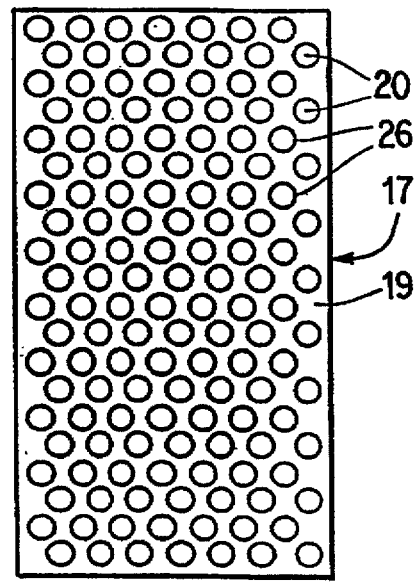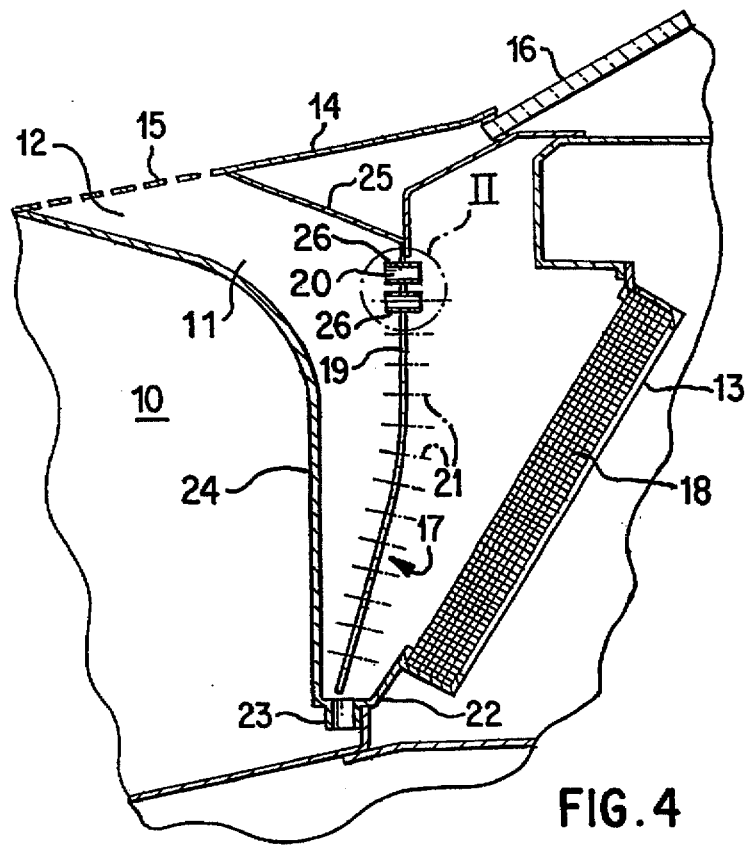

AIR INLET INSTALLATION FOR AN AUTOMOBILE

BACKGROUND AND SUMMARY OF THE INVENTION

The invention relates to an air supply installation for the vehicle body of a motor vehicle, having an air inlet covered by a coarse screen or grid, with an airflow passage connecting the air inlet with an air outlet, having an air filter disposed in the airflow passage and extending over its flow cross section, and having a water separator disposed upstream of the air filter in the airflow passage, which water separator extends over the flow cross section of the airflow passage and has a plurality of openings for the passage of air.

In a known air supply installation of this type (German Patent Publication DE 42 34 045 C1), the water separator, the air filter and an activated charcoal filter are disposed in the sequence mentioned in a horizontal orientation below the fresh air inlet closed off with a coarse screen. The cross section of the air inlet approximately corresponds to that of the airflow passage in which the water separator, the air filter and the activated charcoal filter are disposed. The water separator, not described in detail, has rod-shaped drip channels with the channel openings pointing upward, which are arranged parallel next to and at a distance from each other. Respectively two drip channels extending parallel next to each other are overlapped by a rod-shaped cover channel embodied in the same way, whose channel opening points downward and covers the two adjoining end faces of two drip channels. The fresh air flowing through the water separator is deflected several times between the cover and drip channels, which results in increased flow resistance and noticeable flow noise.

The moisture and wetness deposited on the water separator flow off laterally as a water film via the drip channels. The water is removed via a water drain by a water collecting trough disposed on the bottom of the airflow passage.

It is an object of the invention to improve an air supply installation of the type mentioned at the outset in such a way that, with good water separation, the creation of noise is reduced to a great extent up to its almost complete suppression.

This object is attained in accordance with preferred embodiments of the invention by providing an air supply installation for the vehicle body of a motor vehicle, having an air inlet covered by a coarse Screen or grid, with an airflow passage connecting the air inlet with an air outlet, having an air filter disposed in the airflow passage and extending over its flow cross section, and having a water separator disposed upstream of the air filter in the airflow passage, which water separator extends over the flow cross section of the airflow passage and has a plurality of openings for the passage of air, wherein the water separator is formed by an essentially vertically extending perforated wall, whose perforation holes respectively penetrate the wall with hole axes which are essentially parallel with each other, and wherein the arrangement of the air filter is provided at a short distance from the water separator and parallel therewith inclined at or under an acute angle.

The air supply installation in accordance with the invention has the advantage that the laminar flow resistance generated by the improved water separator acting as a straightener results in a clearly reduced air speed with only little noise generation and very good water separation. Furthermore, this slow air speed prevents separated water droplets adhering to the walls from being carried along. Within the smallest structural space and with a predetermined amount of air per unit of time, the novel water separator and its vertical arrangement in the airflow passage make it possible to set the water separation for an optimized flow resistance and low noise level.

Advantageous embodiments of the air supply installation in accordance with the invention with practical further developments and embodiments of the invention are described below and in the claims.

In accordance with a preferred embodiment of the invention, a tube has been inserted into each perforation hole, which projects from both sides of the wall and is sealed in respect to the wall. The same flow resistance occurs in each one of the approximately horizontal tubes penetrating the vertical wall. Occurring differences are compensated by the tube diameter and/or the tube length. The water flowing off along the wall from above cannot enter the tubes and flows off directly downward. The water droplets carried along in the airflow come into contact with the wall over the length of the tube and flow downward toward the outflow end of the tube under the force of gravity. If in accordance with a preferred embodiment of the invention the tubes are designed to be twisted in the interior, even the last drops are removed from the airflow with the help of a centrifugal force. On the back of the wall, viewed in the direction of flow, mushroom-shaped air eddies form at the outlet end of the tubes which, assisting the force of gravity, direct the water droplets arriving at the lower outflow end of the tube toward the vertical wall into a zone of slow flow, where they flow off as a film of water.

In accordance with other preferred embodiments of the invention, the tubes only protrude toward the upstream side of the water separator wall. In certain preferred embodiments, these tubes can be formed by a punching operation on a sheet metal separator wall, with the material from the punched out openings forming the tube walls.

In accordance with a preferred embodiment of the invention, the air passage surface of the water separator is made several times larger than the cross section of the air inlet. This cross section, which is considerably larger in respect to the cross section of the coarse screen or covering grid, clearly contributes to the reduction of the air speed.

Other objects, advantages and novel features of the present invention will become apparent from the following detailed description of the invention when considered in conjunction with the accompanying drawings.

BRIEF DESCRIPTION OF THE DRAWINGS

FIG. 2B is an enlarged representation, similar to FIG. 2 and showing another alternative embodiment of a water separator;

FIG. 3 is an end view of a water separator in the air supply installation in FIG. 1; and FIG. 4 is a view similar to FIG. 1 which shows an air supply installation constructed according to another preferred embodiment of the invention.

DETAILED DESCRIPTION OF THE DRAWINGS

Figure 1:
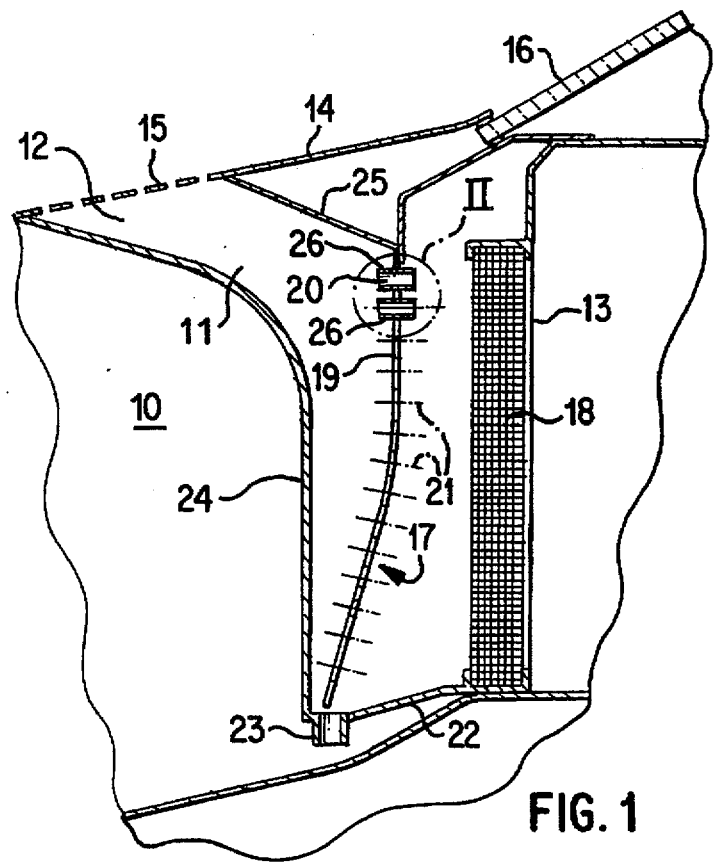
FIG. 1 is a longitudinal sectional schematic view through an air supply installation for a motor vehicle body, constructed according to a preferred embodiment of the invention.

The air supply installation for a motor vehicle schematically sketched in section in FIG. 1 is disposed in the front part 10 of the vehicle body and has an airflow passage 11 connecting an air inlet 12 with an air outlet 13. In this case the air inlet 12 is disposed in an upper wall of the vehicle body, sometimes also in the hood, and is covered by a coarse screen or covering grid 15. The air outlet 13 is connected with a heating or air conditioning installation of the vehicle, not shown here. The windshield of the vehicle is indicated by 16.

Viewed in the direction of the airflow, a water separator 17 and an air filter 18 are arranged behind each other in the airflow passage 11. Both the water separator 17 and the air filter 18 extend completely over the flow cross section of the airflow passage 11. The water separator 17 is formed by an essentially vertically extending perforated wall 19, whose perforation holes 20 respectively penetrate the wall 19 completely, wherein their hole axes, indicated by 21, are aligned parallel with each other. Only the two center and upper perforation holes 20 are shown in FIG. 1, while the remaining perforation holes 20 located in the sectional plane are indicated by their hole axes 21. In the center area the wall 19 is slightly curved, so that its lower end extends at an acute angle with the upper end. The air filter 18 is disposed at a slight distance from the water separator 17 and is essentially arranged parallel with it. In this case the parallelism is limited to the region between the upper and the center area of the water separator 17, while the distance of the wall 19 from the air filter 18 continuously increases in its lower area because of its acutely angled course.

At the underside of the water separator 17 and the air filter 18, the airflow passage 11 is limited by a collecting trough 22 with a water drain 23. A front border wall 24 of the airflow passage 11 extends from the front end of the collecting trough 22 as far as the front edge of the air inlet 12. This border wall 24 first extends vertically, starting at the collecting trough 22, is curved near the upper area of the wall 19 and then extends straight to the front lower edge of the air inlet 12. An upper border wall 25 of the airflow passage 11 extends from the upper edge of the wall 19 as far as the rear upper edge of the air inlet 12. The lateral border walls of the airflow passage 11, which respectively laterally adjoin the front border wall 24, the upper border wall 25 and the collecting trough 22, are not shown here. The airflow passage 11 is given a flow cross section by the border walls 24, 25, which flow cross section increases starting at the air inlet 12, becomes maximal in the area of the water separator 17 and the air filter 18 and is a multiple of the cross section of the air inlet 12. Because of this embodiment of the airflow passage 11, the fresh air flowing in via the air inlet 12 flows against the upper wall area of the water separator 17 and the wall 19 and from there flows along the wall 19 as far as the collecting trough 22. As already mentioned, the wall 19 extends at an approximately acute angle in its lower end area, so that its distance from the front border wall 24, which extends vertically there, tapers downward toward the bottom and the flowing air meets the lower area of the wall 19 at an acute angle and flows through the perforation holes 20.

Figure 2:
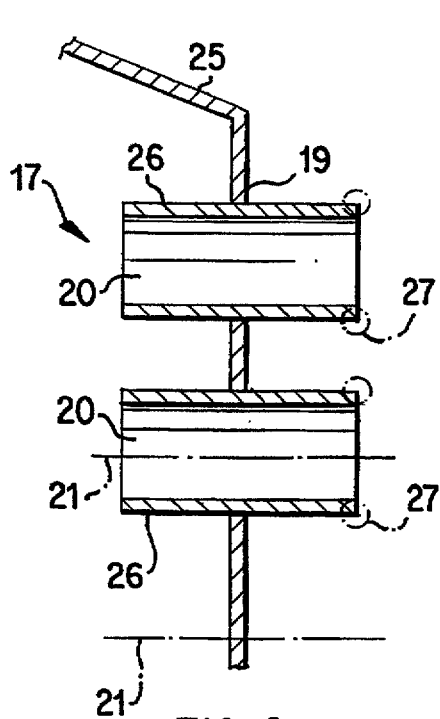
FIG. 2 is an enlarged representation of the section II in FIG. 1.

As indicated in FIG. 1 in the area of section identified by II, which can be better seen in the enlarged representation of this section in FIG. 2, a tube 26 has been inserted essentially without gaps into each perforation hole 20 in the wall 19 and projects on both sides past the wall 19. To improve the water separation effect, the tubes 26 can be twisted on the inside (as shown schematically at T in FIG. 2B). A front view of the water separator 17 is represented in FIG. 3. The distance of the air filter 18 from the water separator 17 is determined by the ratio of the sum of all tube cross sections in the water separator 17 to the filter surface of the air filter 18.

Figure 2A:
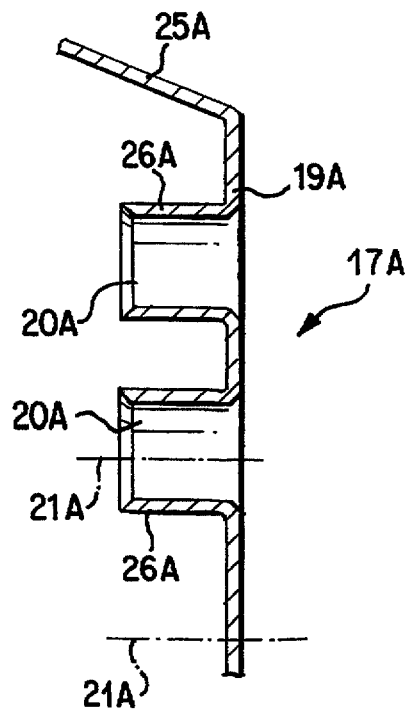
FIG. 2A is an enlarged representation, similar to FIG. 2 and showing an alternative embodiment of a water separator.

FIG. 2A shows a modified construction where the same reference numerals with the suffix "A" are used for parts similar to those shown and described for FIGS. 1 and 2. The tubes 26A are formed by a punching operation on a sheet metal plate forming the water separator wall 19A. Since these tubes 26A extend upstream of the water separator wall 19A, they function in a manner similar to that described below for the separator wall 19 and tubes 26.

The water separator could also be formed as a molded plastic part, including the tubes, according to other contemplated embodiments.

The distance of the air filter 18 from the water separator 17 is determined by the air flow reduction through the water separator depending on the sum of the tube cross sections in the water separator, i.e., the bigger the area of the tube cross section, the shorter the distance could be between the water separator and the air filter while still assuring that no water particles reach the air filter.

The function of the described air supply installation is as follows:

Prior to entering the air filter 18 of a very large cross section, the moist fresh air flowing in through the air inlet 12 must flow through the upstream water separator 17 of also a very large cross-sectional surface. The laminar flow resistance generated by the wall 19 with the many tubes 26 results in a clearly reduced air speed because of the many times larger cross section in comparison with the cross section of the air inlet 12. This results in reduced noise generation and very good water separation, at the latest in the tubes 26. The low air speed prevents water drops adhering to the wall 19 from being carried along. The water droplets still carried along in the air flow come into contact with the wall over the length of the tubes 26 and flow downward to the outlet end of the tubes 26 under the effects of gravity. If the tubes 26 are additionally twisted, even the last drops of water are removed from the air flow with the aid of the centrifugal force generated by the twisting of the air column in the tube 26. Typical mushroom-shaped air eddies form at the outflow end of each tube 26, such as occur when a rapid flow exits into a large space, which are indicated by 27 in FIG. 2. Aiding the gravitational force, these air eddies 27 direct the water drops arriving at the lower outflow end of the tube 26 to the vertical wall 19 into a zone of slower flow, where the water drops form a water film and run off downward to the collecting trough 22.

A modified air supply installation for a motor vehicle is represented in FIG. 4 which has been varied to the extent that, instead of being parallel with water separator 17, the air filter 18 is arranged at an acute angle in respect to it so that, viewed in the direction of air flow, it extends obliquely upward and in the process is inclined upstream. Otherwise the structure and the function of this modified air supply installation corresponds with the one described above, so that like components are provided with the same reference numerals.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air supply installation for the vehicle body of a motor vehicle, having a vehicle body air inlet covered by a coarse screen or grid, with an airflow passage connecting the air inlet with an air outlet, having an air filter disposed in the airflow passage and extending over its flow-cross section, and having a water separator disposed upstream of the air filter in the airflow passage, which water separator extends over a substantial majority of the flow cross section of the airflow passage and has a plurality of openings for the passage of air, wherein the water separator is formed by an essentially vertically extending perforated wall, whose perforation holes respectively penetrate the wall with hole axes which are essentially parallel with each other, and wherein the arrangement of the air filter is provided at a short distance from the water separator and parallel therewith, inclined at, or under an acute angle.

2. An installation in accordance with claim 1, wherein a tube, projecting at least at the upstream side of the wall, is inserted essentially free of gaps into each perforation hole.

3. An installation in accordance with claim 1, wherein the air penetration surface of the water separator is many times greater than the cross section of the air inlet.

4. An installation in accordance with claim 2, wherein the air penetration surface of the water separator is many times greater than the cross section of the air inlet.

5. An installation in accordance with claim 1, wherein the air flow passage is limited in such a way that the air flowing in via the air inlet flows to the upper wall area of the wall constituting the water separator and from there flows approximately parallel with the wall to the lower wall area.

6. An installation in accordance with claim 4, wherein the air flow passage is limited in such a way that the air flowing in via the air inlet flows to the upper wall area of the wall constituting the water separator and from there flows approximately parallel with the wall to the lower wall area.

7. An installation in accordance with claim 5, wherein the air flow passage has a border wall extending at a distance from the water separator and at an acute angle with it.

8. An installation in accordance with claim 7, wherein the distance between the border wall and the water separator tapers down in the direction toward the lower area of the water separator.

9. An installation in accordance with claim 1, wherein the air flow passage is bordered below the water separator by a collection trough having a water drain.

10. An installation in accordance with claim 2, wherein the tubes are twisted on the inside.

11. An installation in accordance with claim 6, wherein the air flow passage is bordered below the water separator by a collection trough having a water drain.

12. An installation in accordance with claim 6, wherein the tubes are twisted on the inside.

13. An installation in accordance with claim 11, wherein the tubes are twisted on the inside.

14. An installation in accordance with claim 8, wherein the air flow passage is bordered below the water separator by a collection trough having a water drain.

15. An installation in accordance with claim 14, wherein the tubes are twisted on the inside.

16. An installation in accordance with claim 2, wherein said tubes differ in their diameter.

17. An installation in accordance with claim 2, wherein said tubes differ in their length.

18. An installation according to claim 2, wherein said tubes extend at only the upstream side of the wall.

19. An installation according to claim 2, wherein said tubes extend at both sides of the wall and are connected to the wall at said perforation holes by one of soldering, welding and gluing.

20. An installation according to claim 18, wherein said tubes are formed by punching plastic deformation of the wall.

* * * * *